*INVENTORS*
WIJBE JOHANNES AOSTERKAMP
JACABUS FRANSEN
BY

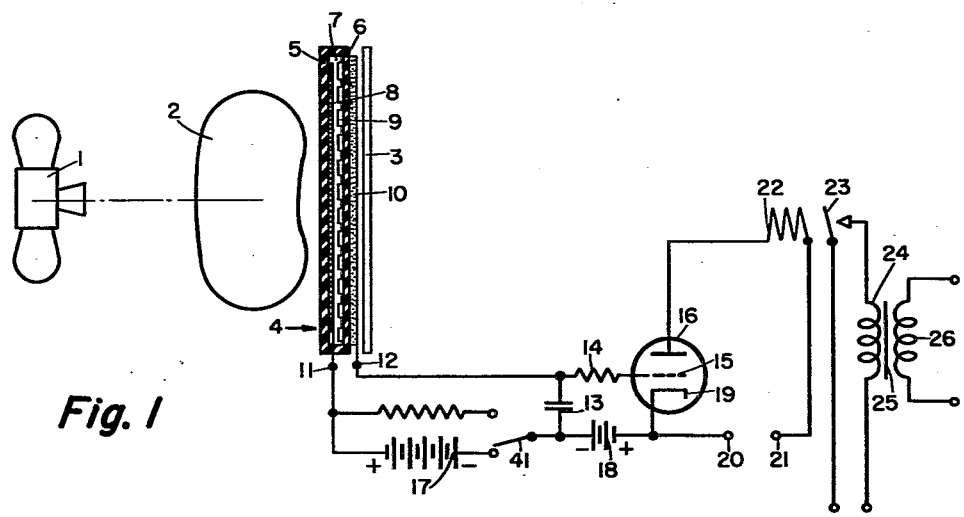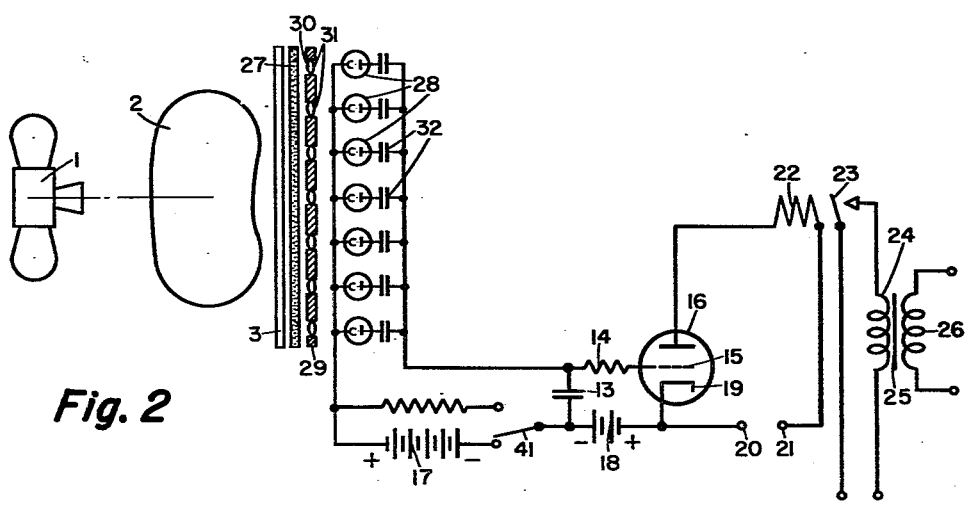

AGENT

2,796,527

DEVICE FOR AUTOMATICALLY DETERMINING THE OPTIMUM EXPOSURE TIME IN RADIOGRAPHY

Wijbe Johannes Oosterkamp and Jacobus Fransen, Eindhoven, Netherlands, assignors, by mesne assignments, to North American Philips Company, Inc., New York, N. Y., a corporation of Delaware Application March 3, 1954, Serial No. 413,883

Claims priority, application Netherlands March 3, 1953

13 Claims. (Cl. 250—95)

The time required for making radiographs depends upon the power supplied to the X-ray tube, the absorption of the rays by the object and the sensitivity of the photographic plate or film. Since corresponding objects may exhibit considerable differences in radiation absorption, accurate determination of the exposure time often entails difficulties. For this reason it is becoming frequent practice to measure the intensity of the rays, prior to making the exposure proper, at such a point behind the object which is situated in a zone important for the diagnosis. By means of available data about the blackening of a photographic plate or film as a function of the X-ray dose, the required exposure time can thus be deduced from the product of radiation intensity and exposure time required for a given blackening. In the case of living objects this method suffers from the disadvantage that the measurement itself requires a certain amount of X-ray radiation which is for the major part absorbed by the object, thus involving the risk that when the exposure is made the total dose exceeds that which is permissible.

Devices for making radiographs are in use comprising a radiation-sensitive indicator, by which the time of operation of the X-ray tube is determined automatically. The radiation passing through the object produces electron-conduction in the indicator and the electron current thus produced is a measure of the intensity of the radiation through the object. Said current is employed for charging or discharging a capacitor and as a result of a given variation of the accumulated electric load thereof the X-ray apparatus is switched off automatically.

The radiation-sensitive element of such an apparatus may contain an ionisable gas and consist of a flat box-shaped ionisation chamber whose active surface substantially corresponds in size to that of the image.

In a further form, the radiation indicator is a fluoroscopic screen and the light produced therein is collected by a photo-electric cell.

The different indicators used have the property in common that the electric current produced is approximately proportional to the average value of the X-ray intensity throughout the active surface of the radiation-sensitive element.

The exposure time is thus determined as function of an electric current, the strength of which may have, for several reasons, another value than the current strength obtained if the indication is limited to a part of the image size situated within the zone important for observation. Such a limitation also entails difficulties, primarily since the measuring field is required to be determined beforehand. One of the reasons that the average radiation intensity throughout the whole surface is not always proportional to the average intensity behind those parts of the object which are important for the diagnosis, is found in making exposures of objects of different size. Considerable differences may more particularly arise if part of the radiation incident on the indicator passes adjacent to the object and is consequently unweakened. It has been attempted to mitigate this disadvantage by modifying the size of the active surface of the radiation indicator in accordance with the size of the object. In this case, discrepancies of the optimum exposure time may still occur if, unexpectedly, the object is somewhere highly pervious to X-rays.

In a known device which allows the size of the active surface of the indicator to be changed, use is made of an ionisation chamber which is shaped as a flat box and comprises several measuring fields of comparatively small size, which are used either separately or in groups. By a suitable shape of the individual fields it is possible to obtain active surfaces for making lung, skull and joint exposures respectively.

In a device comprising an indicator made up of a fluorescopic screen and a photo-electric cell, it is furthermore known to blend the screen to a greater or lesser degree by means of a lead slide placed in the path of the X-ray beam.

The present invention relates to devices of the aforesaid type for automatically determining the operating time of an X-ray tube in radiography, by means of an X-ray sensitive indicator making possible or producing an electron current which depends upon the X-ray intensity behind the object, the invention having for its objects to avoid said disadvantages. According to the invention the indicator comprises a number of radiation sensitive electron discharge tubes or other electronic cells each of which covers one of a number of adjoining fields forming the active surface of the indicator and which jointly cover the whole or substantially the whole surface struck by the X-rays, each cell, if desired in combination with a suitable element, having the property that its electron-conduction drops to a low value, independently of the X-ray intensity, after a time depending upon the X-ray intensity.

The above property of the radiation-sensitive cells is utilised for limiting the influence of overexposed fields on the exposure time, since cells, placed in such a field, are operative only for a small part of the exposure time. On exceeding a given, not excessively large radiation dose, the cells no longer influence the exposure time. Cells placed at less exposed fields are not so soon made inoperative by the existing dose.

The step required therefor implies that the electric circuit of each cell includes a capacitative impedance, which may be obtained by means of a special construction of the cells or by employing a separate capacitor.

In the device according to the invention, the contribution of each field, through its electronic cell, to the total electron current, much as in known devices, is initially governed by the local intensity of the X-rays and at the beginning of the exposure said current is consequently about proportional to the average X-ray intensity, reckoned throughout the surface of the indicator. According to the invention it has been learned that said current decreases with time, since the initially considerable contributions of overexposed fields decrease. In order for this decrease to be of actual importance provision should be made that the charge, which is required to produce the potential variation on the capacitor sufficiently to interrupt the current through the cell or at least to reduce it to a low value, is small as compared with the charge-conveying capacity of said current passing throughout the exposure time.

Hence, the influence of less exposed parts gradually increases as the exposure proceeds and the total current becomes smaller than is proportional to the average value of the X-ray intensity throughout the active surface of the indicator. In this manner the preponderating influence of the unweakened or slightly weakened radiation on the exposure time is considerably reduced and the exposure time is better matched to the intensity level at less strongly exposed patches.

The whole electron current may be used in a known manner for charging or discharging a capacitor connected in series in the common supply circuit for the cells, the voltage variation thus produced being utilised for controlling an electronic relay operating the main switch of the X-ray apparatus.

Furthermore it is possible to derive a voltage from the discharge current in each cell or from the increase of decrease of the electric charge caused by said current and to supply this voltage to the grid-circuit of a discharge tube. In this instance, each cell co-acts with a discharge tube, whose joint discharge currents operate a relay co-acting with the main switch of the X-ray apparatus.

An ionisation chamber for use in the device according to the invention may comprise two flat opposite walls separated by a small interstice and made from insulating material, the walls being connected together at the edges so that the assembly is shaped as a flat box. One of the facing surfaces of the walls may be provided with an uninterrupted layer of electrically conductive material and a similar coating on the other wall may be divided into separate adjoining fields insulated from one another. The outer surface of the last-mentioned wall may be provided with a homogeneous layer of conductive material, which may alternatively be divided into a number of fields corresponding to that of the opposite side. The chamber is filled with an ionisable gas or with a solid material whose conductivity changes on irradiation with X-rays. Several materials known as semiconductors are possessed of this property to a greater or lesser degree.

An indicator, in which the X-rays are converted into visible luminescence and which is suitable for use in a device according to the invention is obtained by placing behind a fluoroscopic screen a number of light-sensitive photo-electric or other electronic cells, for example cells producing an electric current by the action of the luminescence, and by distributing the light from said screen over the cells. To this end a grid made from a material impervious to light and furnished with openings may be placed in the path of the light. Each opening of the grid may contain a small lens to concentrate the light of that part of the surface of the fluoroscopic screen, which is commanded by the lens, onto the cell.

By gradually suppressing the electron current produced by the strongly exposed fields it is ensured that the total current of the device no longer varies linearly but according to a curve which more closely matches the blackening curve of the photographic plate or film over a part of the blackening zone which extends about from average blackening into the zone of very strong blackening.

In the device according to the invention, the logarithmic nature of this curve in the zone of slight blackening is approached by increasing the sensitivity to low or highly weakened radiation intensities.

When using an ionisation chamber, materials of different composition and widely varying atom number, for example, tin, copper and aluminium, may for said purpose be used as a wall coating for the electrode divided into fields. In a suitable form of application of said materials, a number of fields consist of one material, another number of fields consist of a second material and any further number of fields consist of a third material, the division being such as to obtain combinations of adjacent fields of the different materials, use being made of the property of the materials to emit photo-electrons by the action of X-rays to different degrees.

When using a luminescence indicator of the aforesaid type the openings of the grid may be covered with filters of different transparency. A further possibility consists in the use of a fluoroscopic screen divided into fields made up of materials of selectively different X-ray absorbing capacity.

In order that the invention may be readily carried into effect it will now be described in detail with reference to the accompanying drawing, given by way of example, in which Fig. 1 illustrates the use of an ionisation chamber, one electrode of which is divided into fields capacitatively associated with a common electric circuit.

Fig. 2 shows the use of a similarly operating luminescence indicator.

Figure 3:
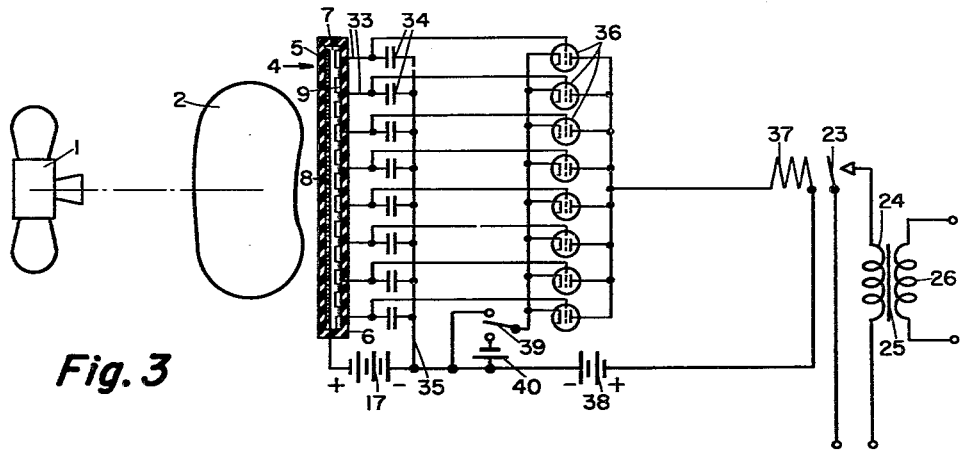
Figs. 3 and 4 show examples of a further use of the two indicators.

Fig. 1 is a diagrammatic view of a device for making radiographs according to the invention. The X-ray tube is denoted by 1, the cross-section of the object by 2. The radiation-sensitive material, for example a photographic plate or film on which the X-ray image is formed, is denoted by 3. Provided between the object 2 and the photographic plate 3 is an ionisation chamber 4 consisting of a square or rectangular flat box approximately of the size of the photographic plate. The walls of the ionisation chamber consist of insulating material which absorbs as little X-rays as possible. They may, for example, be made from the material known under the registered trademark "Perspex" or from other suitable synthetic resins. The front wall 5 and the rear wall 6 are separated from each other by a small intermediate space 7 and adjoin each other at the edges. The facing surfaces of the walls are provided with a conductive layer, for example of graphite. The wall 5 is provided with an uninterrupted layer 8 and the conductive surface of the wall 6 is divided into fields 9 which are insulated from one another. The fields may be rectangular or shaped as a regular polygon and adjoin each other to cover the whole surface. They are obtained by providing an uninterrupted layer of conductive material and scraping off narrow paths along parallel lines in two directions at right angles to each other.

The wall 6 is externally provided with an uninterrupted conductive layer 10 so that, with the wall as a dielectric, the coating 9 divides into fields and the last mentioned layer 10 forms as many capacitors as there are separate fields. The layer 10 and the coating 8 are furnished with terminals 11 and 12.

The terminal 12 is connected to a capacitor 13 and via a resistor 14 to the control electrode 15 of a discharge tube 16. The other terminal of the capacitor 13 is connected on the one hand via a voltage source 17 to the terminal 11 and on the other hand via the supply 18 to the cathode 19 of the discharge tube 16.

Under the influence of X-rays from the X-ray tube 1 electron-conduction occurs in the ionisation chamber. A potential difference maintained by means of the supply source 17 produces an electron current. Electron-conduction is obtained with the use of a gaseous medium filling the ionisation chamber wherein the gas is ionised. Another form of electron-conduction is obtained with the use of some semi-conductor as a filling material, for example selenium, whose conductivity is increased by incident X-rays.

In the zones struck by X-rays which are only slightly weakened after penetrating the object, by passing through tissues of low radiation-absorption, the electron-current produced in the separate discharge paths is considerable but soon diminishes owing to the counter voltage produced by the capacitative coupling with regard to the common current supply coating 10. The electron current is smaller in zones where the absorption of X-rays is stronger but, since the conductivity resulting from irradiation is lower, it will retain its value for a longer time.

The joint electron current charges the capacitor 13, thus producing at the poles a potential difference oppositely directed to the voltage of the supply source 18.

The sum of said voltages is operative in the grid circuit of the discharge tube 16 and controls the anode current. When using a gas-filled discharge tube it becomes conductive when the potential on the control electrode 15 attains cathode-potential. The discharge current produced is employed in a known manner for operating an electro-magnetic relay whose winding 32 is included in the anode circuit of the discharge tube 16. This tube is supplied with alternating voltage which is applied to terminals 20, 21. When the relay becomes operative contact 23 opens and the current through the primary 24 of the high voltage transformer 25 is interrupted. The secondary 26 serves to supply the X-ray tube 1.

Fig. 2 shows a device comprising a luminescence indicator. A fluoroscopic screen 27 is disposed behind the photographic plate or film 3. Opposite screen 27 are arranged a number of photo-electric cells 28 receiving light from this screen. Disposed between the rows of photo-electric cells 28 and the screen 27 is a grid 29 consisting of a material impervious to light from the screen, which grid is provided with an opening 30 for each photo-cell so that each cell collects the luminescence from a portion of the screen 27. Each opening 30 may be provided with a lens 31 to concentrate incident light.

Different electronic cells may be substituted for photo-cells and besides cells with external photo-effect it is possible to use such cells with internal photo-effect.

Connected in series with each cell 28 is a small capacitor 32. As a result of electron currents produced during exposure, said capacitors are charged and the joint current produces, similarly as stated with reference to Fig. 1, a change of potential difference at the poles of the capacitor 13. Otherwise, the operation of this device completely corresponds to that shown in Fig. 1. In the circuits comprising strongly exposed cells, the capacitors 32 soon reach the charging condition in which the potential difference on the capacitors is such as to prevent the passage of current through the cells, which condition takes a longer time to attain in other circuits with less strongly exposed cells. Hence, the total current required to produce the prescribed variation of electric charge on the capacitor 13 is decreased gradually and this yields the result aimed at by the invention, that is to say a reduced influence of the strongly exposed parts of the exposure on the exposed time.

Figure 4:
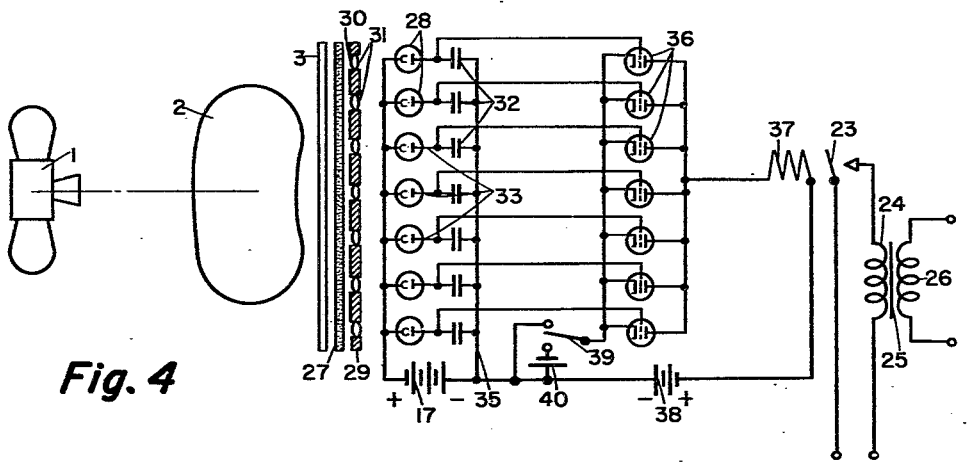

Figs. 3 and 4 show devices according to the invention, in which the signal current is amplified. The device shown in Fig. 3 comprises an ionisation chamber as a radiation-sensitive electronic cell. This ionisation chamber is different from that used in the device shown in Fig. 1 in that the outer coating 10 of the wall 6 has been omitted and all the fields 9 of the inner coating of the wall 6 are connected to supply conductors 33 passing through the wall 6. These conductors 33 are associated via capacitors 34 to the common conductor 35 which is secured to the negative terminal of the source 17.

The circuit-arrangement comprises as many triodes 36 as capacitors 34, and the control electrode of each tube is connected to the conductor 33 and consequently to one terminal of a capacitor 14, the anodes and cathodes of said tubes being connected in parallel. The total anode current of the tubes passes through the magnet winding 37 of an electromagnetic relay. The anode circuit comprises a supply 38. The cathode lead may be connected either directly or via a supply source 40 of negative voltage to the negative terminals of supply sources 17 and 38.

By the action of the X-rays the discharge paths formed by means of the separate fields in the ionisation chamber become conductive to a greater or lesser degree. Each path conveys an electron current which charges the associated capacitor 34. The direction of the voltage supplied by the current source 17 is such as to drive the capacitor poles, connected to the control electrodes of the tubes 36, positive so that on charging the capacitors the potential difference with regard to the common cathode lead decreases. The anode current of the tubes gradually increases with an increase in capacitor charging voltages, the relay 37 becoming de-energized when the anode current exceeds a particular value.

In order to discharge the capacitors 34 after exposure, provision is made of a switch 39 adapted to connect the cathode lead of the tubes 36 directly to the negative terminals of the supply sources 17 and 38. The drop of potential of the cathodes of the triodes 36 enables the capacitors 34 to become discharged through said tubes. The switch 39 is brought back into its initial position prior to making the next exposure.

In the device shown in Fig. 1, the charge of the capacitors is cancelled by interconnecting the terminals 11 and 12 and by irradiating the ionisation chamber with X-rays or by moving the walls together until the coatings engage each other. In Fig. 2, the discharge is effected by moving the switch 41 into the position wherein the supply 17 is connected out of circuit with simultaneous irradiation of the indicator with X-rays.

The luminescence indicator shown in Fig. 4 corresponds to that shown in Fig. 2. It comprises a fluoroscopic screen 27, a lens grid 29 and as many photo cells 28 as the grid has lens openings 30. A photo-cell is placed behind each lens 31.

Similarly as in the device shown in Fig. 2, a capacitor 32 is connected in series with each discharge path. Otherwise, the two forms of construction shown in Figs. 3 and 4 are equal. In Fig. 4 the reference numerals indicating corresponding elements are the same as in Fig. 3.

After switching on the X-ray tube 1 to make a radiograph of the object 2 on the photographic plate 1, the fluoroscopic screen 27 is excited and the X-ray energy absorbed therein is transformed into light. This light actuates the photo-cells 28 to a degree commensurate with the brightness of the luminescence incident on each lens 31. The capacitors 32 are charged by the photo-currents and the potential difference thus produced is supplied as a positive grid voltage to the discharge tubes 36. The total anode current of these tubes operates the electromagnetic relay 37.

Upon termination of an exposure, by interrupting the supply current of the X-ray apparatus by means of switch 23, the switch 39 shown in Figs. 3 and 4 is changed over, in order to drain the charge from the capacitors 32, 34.

At the beginning of a next exposure, said switch is required to assume its previous position, the grids of the discharge tube thus being driven highly negative via the supply source 40 and the anode current being suppressed.

The coil 37 releases contact 23 and the supply current of the X-ray apparatus is switched on. Owing to accumulation of charge in the capacitors 34 and 32 by the action of X-rays, the grid potentials of the several discharge tubes will increase and this increase will be faster according as the intensity of the rays incident on the cell concerned is higher. Consequently the contribution of each discharge tube to the total current steadily approaches to a value determined by the voltage of the supply 17. Said share cannot be overstepped so that the influence of strongly exposed cells is limited, whereas the less strongly and slightly exposed cells exert an influence to a higher degree, since they also bring about, although more slowly, the required increase in grid potential.

By varying the voltage from the supply source 17 it is possible to choose the optimum setting.

What is claimed is:

1. Apparatus for automatically determining the exposure time of an object irradiated by X-radiation comprising means responsive to X-radiation passing through the object to convert the same into an electrical current of a magnitude proportional to the intensity of radiation, said means comprising a plurality exceeding two of individual radiation-responsive elements covering a field corresponding to a cross-sectional area of the object being irradiated with each of said elements covering a discrete portion of said field, means to limit the current produced by each of said radiation-responsive elements after a time interval dependent upon the intensity of the radiation impinging on the radiation-responsive elements to a value independent of the radiation intensity, and means connecting said radiation-responsive elements with a common electrical condition responsive device responsive to the collective outputs of said radiation-responsive elements to indicate and control the time of exposure of said object to said X-radiation.

2. Apparatus for automatically determining exposure time of an object irradiated by X-radiation as claimed in claim 1 in which each radiation-responsive element is connected in series with a capacitor and the radiation-responsive elements together with the series-connected capacitors are all connected in parallel with the indication and control means.

3. Exposure time control apparatus as claimed in claim 2 in which each radiation-responsive element is part of an ionization chamber having two opposed walls of insulating material through which the X-radiation passes separated by an ionizable medium, the inner surface of one of the walls being covered with a continuous conductive coating, a plurality exceeding two of conductive coatings each covering a discrete portion of the other wall facing the first conductive coating and forming therewith a plurality of radiation responsive elements.

4. Exposure time control apparatus as claimed in claim 3 in which each of the individual ionization chambers is connected in series with a capacitor to a control electrode of an electron discharge device, the output of the electron discharge device being connected in parallel to the indicating and control means.

5. Exposure time control apparatus as claimed in claim 4 in which each of the electron-discharge devices has a cathode source and the cathode sources are connected in parallel through switching means to a source of negative potential.

6. Apparatus for automatically determining exposure time of an object irradiated by X-radiation as claimed in claim 1 in which said means for converting the radiation into an electrical current of magnitude proportional to the intensity of the radiation comprises a luminescent screen adapted to convert the X-radiation passing through the body to radiation in the visible and near-visible regions of the spectrum, a plurality of electronic devices each adapted to scan a portion of the screen and convert the radiation produced thereby to an electrical current of magnitude proportional to the radiation intensity impinging thereon, means interposed between said electronic devices and the screen to divide the latter into a number of areas corresponding to the number of electronic devices to limit each electronic device to its associated area, capacitative means connected in series with each of said electronic devices, and means connecting all of said electronic devices and series-connected capacitative means in parallel with said indicating and control means.

7. Apparatus for automatically determining the exposure time of an object irradiated by X-radiation as claimed in claim 6 in which each electronic device is connected in series with a control electrode of an electron discharge device, the outputs of all the electron discharge devices being connected in parallel with said indicating and control means.

8. Apparatus for automatically determining the exposure time of an object irradiated by X-radiation as claimed in claim 7 in which each of the electron discharge devices has a cathode source, all of the cathode sources being connected in parallel through switching means to a source of negative potential.

9. Apparatus for automatically determining the exposure time of an object irradiated by X-radiation as claimed in claim 1 in which the means for connecting the X-radiation to an electrical current of magnitude proportional to the intensity of the radiation is an ionization chamber comprising opposing walls of insulating material separated by an ionizable medium, a conductive coating covering a substantial portion of the inner surface of one of said walls, a plurality exceeding two of conductive coatings each covering a discrete portion of the surface of the other wall facing the first conductive coating and forming therewith a plurality of radiation-responsive elements, and a continuous conductive coating on the opposite surface of the wall carrying the plurality of discrete conductive coatings to form therewith a plurality exceeding two of capacitors each in series with one of said radiation-responsive elements.

10. Apparatus for automatically determining the exposure time of an object irradiated by X-radiation as claimed in claim 1 in which the means for converting the X-radiation into an electrical current of magnitude proportional to the intensity of the radiation is an ionization chamber comprising two opposing walls of insulating material separated by an ionizable medium, a continuous conductive coating covering a substantial portion of the inner surface of one of said walls, the surface of said other wall facing said conductive coating having a plurality exceeding two of individual discrete conductive coatings forming with the coating on the other wall a plurality exceeding two of radiation-responsive elements, each of said latter conductive coatings being connected in series with a capacitor through a conductor extending through the wall of the chamber.

11. Apparatus for automatically determining the exposure time of an object irradiated by X-radiation as claimed in claim 1 in which the means for converting the X-radiation into an electrical current of a magnitude proportional to the intensity of the radiation is an ionization chamber comprising a pair of opposing walls of insulating material separated by an ionizable medium, a continuous conductive coating covering a substantial portion of the inner surface of one of the walls, a plurality exceeding two of conductive coatings each covering a discrete portion of the surface of the other wall facing said first conductive coating, each of said latter conductive coatings being of a material having a different coefficient of photoelectric emission upon bombardment by X-radiation, said latter conductive coatings forming with the continuous conductive coating a plurality of radiation-responsive elements.

12. Apparatus as claimed in claim 11 in which the discrete conductive coatings are divided into separate groups each of which are of the same material, all of the groups together constituting a mosaic.

13. Apparatus for automatically determining the exposure time of an object irradiated by X-radiation as claimed in claim 1 in which the means for converting the X-radiation into an electrical current of a magnitude proportional to the intensity of the radiation, is an ionization chamber comprising a pair of opposing walls of insulating material separated by a solid material whose conductivity changes upon irradiation with X-rays, a conductive coating covering a substantial portion of the inner surface of one of said walls, and a plurality exceeding two of conductive coatings each covering a discrete portion of the surface of the other wall facing said first conductive coating and forming therewith a plurality of radiation-responsive elements.

References Cited in the file of this patent

UNITED STATES PATENTS

| | | |
|---|---|---|
| 2,486,866 | Morgan et al. | Nov. 1, 1949 |
| 2,488,315 | Morgan et al. | Nov. 15, 1949 |
| 2,640,160 | Collins et al. | May 26, 1953 |